Patented Oct. 23, 1945

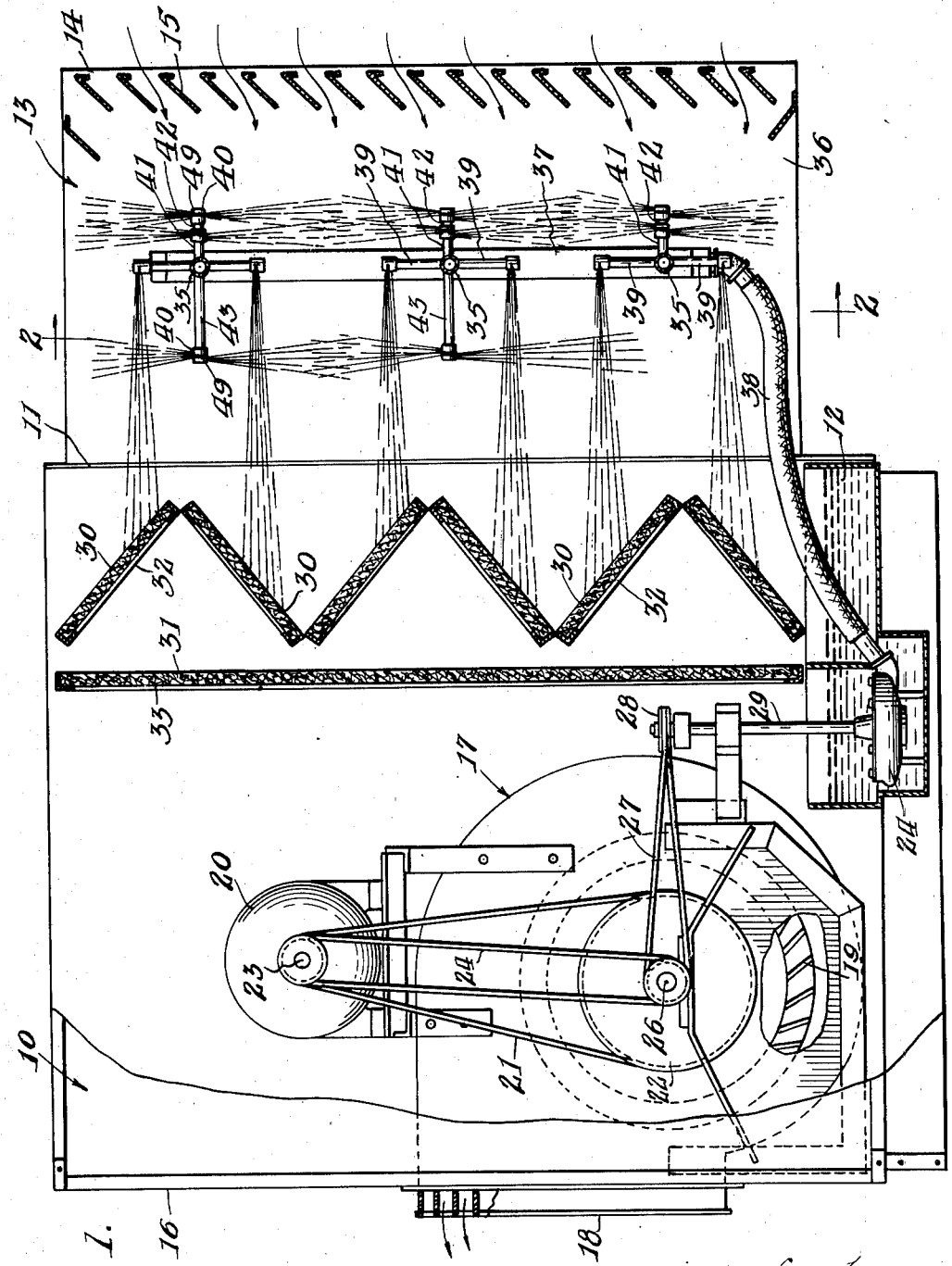

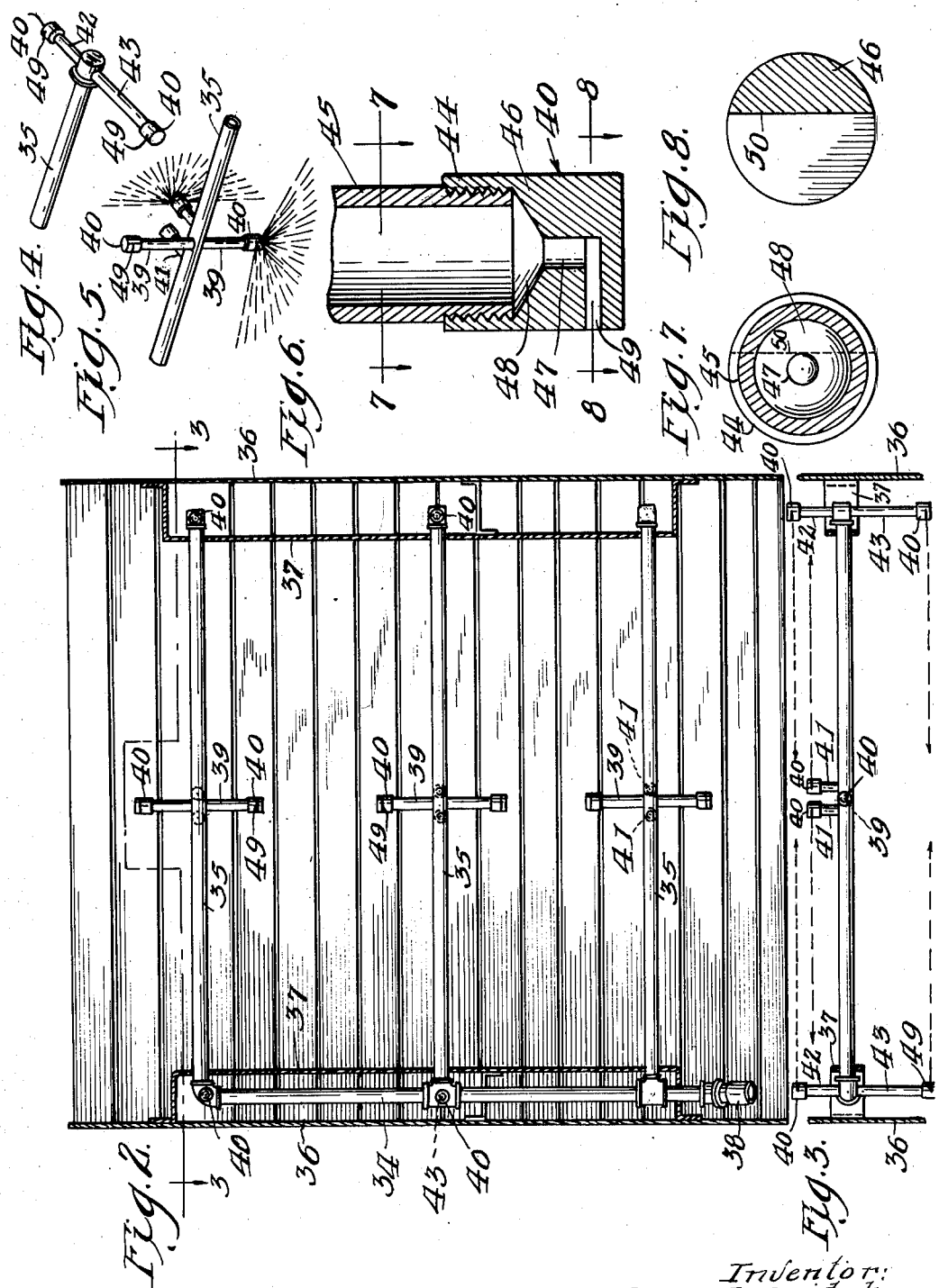

2,387,473

UNITED STATES PATENT OFFICE 2,387,473

AIR CONDITIONING

Bruno J. Spitzka, Harvey, Ill., assignor to Comfort Products Corporation, Harvey, Ill., a corporation of Illinois Application August 7, 1943, Serial No. 497,726

4 Claims. (Cl. 183—13)

This invention relates to improvements in air cooling and filtering and particularly to an evaporative cooler of high efficiency.

It is a particular object of the present invention to provide an evaporative cooler adapted to deliver a large and continuous volume of cooled and filtered air suitable for domestic or industrial use by a novel arrangement of apparatus and improved means whereby the dry bulb temperature of the cooled and washed air closely approximates the wet bulb temperature at the air inlet.

The present invention in general relates to an evaporative cooler comprising a casing having an air inlet adjacent one end, an air outlet adjacent the opposed end, blower means adjacent the air outlet, angularly arranged filter elements extending across the air path to provide an increased air filter surface, jet means for saturating the filters with water and for washing them and an eliminator filter on the discharge side thereof, the invention being characterized by a second set of jets which are constructed and arranged to deliver a substantially fan-shaped flat spray of water under pressure across the path of the air stream immediately upon introduction, in one or more planes perpendicular to the path of the air thus causing greater and more effective contact of water with the air stream and with a resultant material increase in efficiency.

Other objects relate to the specific novel nozzle construction of the aforesaid characteristic spray, the water supply means and arrangement thereof, and other details and arrangement of parts which will be apparent from a consideration of the following specification and drawings, wherein:

Fig. 1 is a fragmentary side elevational view of an air cooling and filtering apparatus embodying the present invention with parts broken away, and principally in longitudinal section.

Fig. 2 is a section on the line 2—2 of Fig. 1.

Fig. 3 is a fragmentary section on the line 3—3 of Fig. 2.

Fig. 4 is a detail view in perspective illustrating an arrangement of a portion of the piping and spray nozzles.

Fig. 5 is a detail view in perspective illustrating an arrangement of another portion of the piping and spray nozzles.

Fig. 6 is a sectional detail of one of the nozzles embodied in the present invention.

Fig. 7 is a section on the line 7—7 of Fig. 6.

Fig. 8 is a section on the line 8—8 of Fig. 6.

Referring to the drawings the reference numeral 10 indicates a main casing section open the full width at the back 11 thereof and substantially the full height down to the water tank 12 at the bottom thereof. Secured to the back 11 so as to be in open communication with the casing section 10, is the auxiliary casing section 13, the outer end 14 being open and provided with a series of louvers 15 to permit a free flow of air to enter the apparatus. Adjacent the outer end wall 16 of casing section 10 is mounted a blower of the squirrel-cage type, generally indicated by the reference numeral 17 having its exhaust opening 18 extending through the end wall 16 so as to permit attachment thereto of a duct system for the area or building to be cooled.

The rotor 19 of blower 17 may be driven as illustrated by the motor 20, suitably mounted on the blower housing, through the belt 21 extending about the blower pulley 22, and a pulley on the axial shaft 23 of the motor. The pump 24, is driven through a belt 25 extending about a second pulley on the shaft 23 of the motor and a pulley on the shaft 26 of the blower, and a second belt 27 extending about a second pulley on the shaft 26 and the pulley 28 on the shaft 29 of the pump.

Within the casing section 10, and adjacent the rear wall opening 11 thereof and extending across the full width of the casing and from adjacent the top thereof to adjacent the water tank 12, are a plurality of filter elements 30. These filter elements are sinuously arranged, that is, they are angularly inclined to each other and inclined to the general direction of the air stream so as to provide greater filter surface for the air being treated, and for further purpose of preventing restriction of the flow of air in view of the excessive amount of water being constantly directed to the surface of the filters.

Intermediate the blower 17 and the sinuous filter composed of the inclined filter elements 30 is a generally vertically extending eliminator filter 31. This eliminator filter 31, on the discharge side of the filter elements 30, provides further evaporative surface and serves to eliminate any entrained moisture from entering the blower and distributing system.

Both the filter elements 30 and 31 are preferably composed of spun or fibrous glass and are suitably retained by the frame members 32 and 33 respectively. Although filter elements composed of spun glass are not as absorptive as elements composed of excelsior and the like materials, the cooler may nevertheless be operated at a high efficiency by the spraying of jets of water thrown in a proper manner and at suitably high pressure so as to keep the interstices between the fibres properly filled with water at all times. On the other hand the use of spun glass has the advantage over the employment of filter elements composed of material such as excelsior in that filter elements of the latter class become clogged with dirt and dust in use and in time transmit objectionable odors and require frequent removal of the filter elements. As distinguished from this fibrous glass filter elements are inert and have no tendency to accumulate or transmit odors, and by employment therewith of jets of water under high pressure, the filter elements are caused to be self-cleaning during the operation of the device. Thus they may be effectively employed for protracted periods of time without replacement, transmission of odors from accumulated materials, impairment of full and effective filter area and surface.

Mounted within the casing section 13 is a pipe rack, shown in side elevation in Fig. 2 and in plan view in Fig. 3, on which are arranged two major series of jets, one being for the purpose of impinging a spray of water under pressure directly against the inclined filter elements 30, concurrent with the direction of the incoming air stream, and for the purpose of keeping the filter elements 30 constantly filled with a spray of moisture and for washing them free of accumulations of dust and dirt. The second series of jets mounted on the pipe rack, and which particularly characterizes the present invention, are constructed and arranged to project substantially flat, fan-shaped sprays of water under pressure into the path of the incoming air stream, upon its introduction into the casing section 13, in a direction substantially perpendicular to the direction of the incoming air stream, and in one or more spaced parallel planes.

Thus the pipe rack comprises a header 34 extending vertically adjacent one of the sides of the casing portion 13 and a plurality of horizontal pipes such as the three spaced pipes 35, one being adjacent the top of the chamber, one adjacent the bottom of the chamber and one intermediate the other two. This pipe rack is supported from the chamber sides 36 by means of a pair of brackets 37, the piping system being connected to the pump 24 by means of the flexible hose connection 38.

Projecting vertically from each of the pipes 35 are a series of jets comprising risers 39, terminating in nozzles 40. There is preferably employed at least one jet for each inclined filter element 30, and therefore in the illustrated construction wherein six inclined filter elements are employed, there is likewise provided six jets positioned so as to thoroughly fill and wash each of the filter elements with a spray of water under pressure. Thus there is provided at least one upwardly and one downwardly extending jet medially of the length of each of the pipes 35, each of the jets being provided with a specific form of nozzle 40, hereinafter more fully described, adapted to deliver a substantially planar fan-shaped spray of water against the filter elements, and by projecting these sprays under pressure such as about 20 pounds per square inch, the filters are kept saturated with water giving a large evaporative surface and are also continuously washed, and as a result remain clean under all conditions without drop in efficiency such as might result by the clogging of the filters with dust, dirt, insects and the like drawn in with the air.

As previously indicated the present invention provides a second series of jets which subject the introduced stream of air to an intensive and preliminary contact with water in a particular manner which has been found to greatly enhance the efficiency of the air conditioning apparatus. This second series of jets comprises one or more groups of horizontally extending risers and associated nozzles each adapted to project a substantially planar, fan-shaped spray of water transversely of the chamber portion 13 in one or more spaced parallel planes. As illustrated three groups of this form of jet are employed. One comprises the relatively short pair of risers 41 and associated nozzles 40 which extend intermediate the length of each of the pipes 35 and adjacent to the vertical risers 39. A second group of slightly longer risers 42 terminating in nozzles 40 are positioned adjacent the terminal ends of the pipes 35 and suitably extend from the respective T's, elbows or caps at both ends of the pipes 35, or may be otherwise suitably associated. A third group of risers 43 likewise terminating in nozzles 40 extend from the ends of at least the upper two pipes 35 in a direction opposed to the risers 42.

Thus as diagrammatically indicated by the broken arrows of Fig. 3, the three groups of jets comprising the pair of risers 41, the pair of risers 42 and the pair of risers 43 are adapted by means of their respective nozzles 40, to subject a substantially planar spray of water in three spaced vertical planes transversely of the path of air as introduced to the casing portion 13.

Figs. 6, 7 and 8 illustrate in detail the characteristic form of nozzles 40 embodied in the present invention. These nozzles are in the form of caps having a threaded flange 44 for engagement to the threaded pipe 45, or one of the risers 39, 41, 42 or 43. The nozzle has a thickened head or cap portion 46 formed with an axial bore 47 extending partially therethrough and may be formed with a counterbore portion 48. The thickened head portion 46 is additionally formed with the transverse slot 49 which intersects the axial bore 47 and preferably terminates at the cord 50 which may be more or less tangent to the periphery of the bore 47.

By employment of the within described nozzles 40 it has been found that a better distribution of water using a smaller number of nozzles may be obtained than is the case when employing atomizing and similar nozzles of complicated construction emitting sprays of circular, conical or the like diffused form. The within described nozzles also have the important advantage over other conventional nozzles in that the nozzles of the present invention have no small orifice to keep clean, and if it is necessary to clean them it can be done by merely inserting a thin piece of metal or wire from the outside, thus eliminating the necessity for disassembling the jet construction.

The respective nozzles 40 are mounted on the vertical risers 39 in a manner whereby the slots 49 open up in a direction extending towards the filter elements 30, and under the previously indicated high pressure, sprays of water are ejected against the inclined surface of the filters in a direction concurrent with the incoming air stream, in a substantially flat, fan-shaped spray in a manner diagrammatically illustrated by the perspective view of Fig. 5. It will be understood, however, that the single diagrammatically illustrated spray being emitted from the downwardly extending riser 39, is merely diagrammatic for the purpose of illustration but actually the stream as it strikes the filter 30 embraces substantially the full width of the filter element with sufficient force to fully saturate the filter and to wash it free of foreign particles filtered from the air.

In a similar manner the nozzles 40 are positioned on the horizontal risers 41, 42 and 43 in a manner whereby the base of the slot 49, or the indicated cord 50 extends substantially vertical and thus causes the ejected spray to project transversely of the cabinet. The sprays from each of this series of jets project to substantially half the width of the casing portion 13 substantially as diagrammatically indicated by the broken arrows in Fig. 3. The general direction of the sprays may be further visualized in the diagrammatic showing in Fig. 1.

As previously indicated water under pressure is supplied to the various nozzles by means of the pump 24 which extends within the water tank 12, the water tank 12 being positioned beneath the inclined filter elements 30 and the vertical filter element 31, to receive the drain from these filters as well as the drain from the various sprays. Although not illustrated, the tank may be suitably equipped with an automatic float valve which, in turn, may be connected to a water supply system which allows for replenishment of water that is consumed by evaporation in cooling the air. By this arrangement the jets in the evaporating chamber are immediately supplied with water when the unit is started and which, in turn, immediately washes any dust or other dirt that may be contained in the incoming air, promptly thoroughly wetting it and eliminating most of the dust that might enter the distributing system before the eliminating filter becomes thoroughly saturated, as might be the case were not the vertically projecting sprays of the present invention employed.

By means of the illustrated and described evaporative cooler an average efficiency of better than 85% may be obtained in constant operation, that is the dry bulb temperature of the cooled and washed air will be depressed to 85% of the differential in temperature between the wet and dry bulb temperature of the air entering the unit, and efficiencies as high as 95% and cooling to substantially that of the wet bulb temperature have been readily attained. As distinguished from this, without the use of the vertically extending sprays which immediately wet the incoming air stream, or by employing in their place commercial atomizing type nozzles which throw conical or other diffused sprays of water, irrespective of direction, efficiency of no greater than 65% or thereabouts are obtainable in equipment of the design of the cooler of this invention.

It will therefore be apparent that the present invention provides a compact and economical evaporative cooler construction adapted to deliver a large volume of filtered, cooled air and which requires a minimum of attention in the cleaning or replacement of parts, and which from the inception of its operation, thoroughly washes incoming air and operates at a high over-all cooling and filtering efficiency.

I claim as my invention:

1. In an air filtering and cooling apparatus of the class described, a casing having air inlet and outlet ends, a blower positioned in the outlet end of the casing for drawing air therethrough, a plurality of spray nozzles arranged adjacent the air inlet end of the casing to provide a transversely extending water curtain for cooling and removing solids from air passing therethrough, air scrubbing means provided within the casing for further cooling and filtering of the air after same has passed through said water curtain, said air scrubbing means comprising a plurality of connected filter mats arranged in zigzag formation to provide alternate upwardly and downwardly inclined faces, and a second set of spray nozzles for directing sprays of water against the inclined faces of said air scrubbing means.

2. In an air filtering and cooling apparatus of the class described, a casing having air inlet and outlet ends, a blower positioned in the outlet end of the casing for drawing air therethrough, a plurality of spray nozzles arranged adjacent the air inlet end of the casing to provide a transversely extending water curtain for cooling and removing solids from air passing therethrough, air scrubbing means provided within the casing for further cooling and filtering of the air, said air scrubbing means comprising a plurality of connected angularly disposed filter mats having their apexes disposed along a horizontal plane to provide alternate upwardly and downwardly inclined faces, and a second set of spray nozzles disposed for directing sprays of water against the inclined faces of said air scrubbing means to clean and saturate same and to provide a second water curtain for further cooling and removing of solids from the air stream.

3. In an air filtering and cooling apparatus of the class described, a casing having air inlet and outlet ends, a blower positioned in the outlet end of the casing for drawing air therethrough, a plurality of spray nozzles arranged adjacent the air inlet end of the casing to provide a transversely extending water curtain for cooling and removing solids from air passing therethrough, air scrubbing means provided within the casing for further cooling and filtering of the air, said air scrubbing means comprising a plurality of connected angularly disposed filter mats having their apexes disposed along a horizontal plane to provide alternate upwardly and downwardly inclined faces, and a second set of spray nozzles disposed for directing sprays of water against the inclined faces of said air scrubbing means to clean and saturate same and to provide a second water curtain for further cooling and removing of solids from the air stream, and filter means between the air scrubbing means and the blower for removing entrained moisture from the air stream passing therethrough.

4. In an air filtering and cooling apparatus of the class described, a casing having air inlet and outlet ends, a blower positioned in the outlet end of the casing for drawing air therethrough, a plurality of spray nozzles arranged adjacent the air inlet end of the casing to provide a transversely extending water curtain for cooling and removing solids from air passing therethrough, air scrubbing means provided within the casing for further cooling and filtering of the air, said air scrubbing means comprising a plurality of connected angularly disposed filter mats having their apexes disposed along a horizontal plane to provide alternate upwardly and downwardly inclined faces, a second set of spray nozzles disposed for directing sprays of water against the inclined faces of said air scrubbing means to clean and saturate same and to provide a second water curtain for further cooling and removing of solids from the air stream, filter means between the air scrubbing means and the blower for removing entrained moisture from the air stream passing therethrough, a water supply reservoir positioned in said casing below said air scrubbing means and filter means, a pump positioned in said water supply reservoir for supplying water under pressure to said spray nozzles, and an electric motor for driving said blower and pump.

BRUNO J. SPITZKA.